US011953020B2

(12) United States Patent
Ohtaguro et al.

(10) Patent No.: US 11,953,020 B2
(45) Date of Patent: Apr. 9, 2024

(54) TURBOFAN

(71) Applicant: DAIKIN INDUSTRIES, LTD., Osaka (JP)

(72) Inventors: Ryuusuke Ohtaguro, Osaka (JP); Kaname Maruyama, Osaka (JP); Masahito Higashida, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/705,072

(22) Filed: Mar. 25, 2022

(65) Prior Publication Data

US 2022/0213898 A1 Jul. 7, 2022

Related U.S. Application Data

(63) Continuation of application No. PCT/JP2020/036046, filed on Sep. 24, 2020.

(30) Foreign Application Priority Data

Sep. 30, 2019 (JP) ................................ 2019-179874

(51) Int. Cl.
*F04D 29/28* (2006.01)
*F04D 1/04* (2006.01)
(Continued)

(52) U.S. Cl.
CPC ........... *F04D 29/282* (2013.01); *F04D 29/30* (2013.01); *F04D 1/04* (2013.01); *F04D 5/007* (2013.01);
(Continued)

(58) Field of Classification Search
CPC combination set(s) only.
See application file for complete search history.

(56) References Cited

U.S. PATENT DOCUMENTS 6,217,285 B1 4/2001 Kurokawa et al.
6,402,473 B1 6/2002 Chapman
(Continued)

FOREIGN PATENT DOCUMENTS

CN 1185547 A 6/1998
EP 11 790 264 A2 5/2007
(Continued)

OTHER PUBLICATIONS

International Preliminary Report of corresponding PCT Application No. PCT/JP2020/036046 dated Apr. 14, 2022.
(Continued)

*Primary Examiner* — Binh Q Tran
(74) *Attorney, Agent, or Firm* — Global IP Counselors, LLP

(57) ABSTRACT

A turbofan includes a circular end plate, a ring-shaped shroud facing the end plate, and a plurality of blade members disposed between the end plate and the shroud. An annular portion of a space between the end plate and the shroud where the blade members are disposed is a pressure-increase flow path. The turbofan causes air to flow from an inner peripheral side to an outer peripheral side of the pressure-increase flow path. A cross-sectional area of the pressure-increase flow path increases gradually from an upstream end toward a downstream end of the pressure-increase flow path.

7 Claims, 6 Drawing Sheets

(51) Int. Cl.

| | |
|---|---|
| ***F04D 5/00*** | (2006.01) |
| ***F04D 15/00*** | (2006.01) |
| ***F04D 17/08*** | (2006.01) |
| ***F04D 17/14*** | (2006.01) |
| ***F04D 29/30*** | (2006.01) |
| ***F04D 29/32*** | (2006.01) |
| ***F04D 29/42*** | (2006.01) |

(52) U.S. Cl.

CPC .......... *F04D 15/0038* (2013.01); *F04D 17/08* (2013.01); *F04D 17/14* (2013.01); *F04D 29/325* (2013.01); *F04D 29/4293* (2013.01); *F05D 2210/40* (2013.01); *F05D 2240/301* (2013.01); *F05D 2240/303* (2013.01); *F05D 2250/50* (2013.01); *F05D 2250/52* (2013.01)

(56) References Cited

U.S. PATENT DOCUMENTS

| | | | | |
|---|---|---|---|---|
| 9,557,070 | B2 * | 1/2017 | Song | F24F 1/0057 |
| 10,976,061 | B2 * | 4/2021 | Kim | F24F 1/0033 |
| 2002/0152760 | A1 * | 10/2002 | Okuda | F24F 13/20 62/426 |
| 2015/0176594 | A1 * | 6/2015 | Gebert | F04D 29/4233 416/186 R |
| 2016/0053775 | A1 | 2/2016 | Volker | |
| 2016/0245298 | A1 * | 8/2016 | Ohtaguro | F04D 29/281 |
| 2017/0096079 | A1 * | 4/2017 | Yokote | B60K 1/00 |
| 2017/0115028 | A1 * | 4/2017 | Lee | B01D 46/523 |
| 2020/0063753 | A1 * | 2/2020 | Higashimori | F04D 29/441 |

FOREIGN PATENT DOCUMENTS

| | | | |
|---|---|---|---|
| GB | 1 598 616 | | 9/1981 |
| GB | 2 225 814 | A | 6/1990 |
| JP | 10-153193 | A | 6/1998 |
| JP | 2010-90835 | A | 4/2010 |

OTHER PUBLICATIONS

European Search Report of corresponding EP Application No. 20 87 3016.8 dated Sep. 30, 2022.

International Search Report of corresponding PCT Application No. PCT/JP2020/036046 dated Nov. 2, 2020.

* cited by examiner

TURBOFAN

CROSS-REFERENCE TO RELATED APPLICATIONS

This is a continuation of International Application No. PCT/JP2020/036046 filed on Sep. 24, 2020, which claims priority to Japanese Patent Application No. 2019-179874, filed on Sep. 30, 2019. The entire disclosures of these applications are incorporated by reference herein.

BACKGROUND

Technical Field

The present disclosure relates to a turbofan.

Background Art

Japanese Unexamined Patent Publication No. H10-153193 discloses a turbofan. The turbofan is provided in an indoor unit of an air conditioner. The turbofan includes an end plate and a shroud between which an air flow path is formed. The turbofan draws air into the air flow path and expels the drawn air radially outward. The cross-sectional area of the air flow path of this turbofan is uniform from the upstream end to the downstream end of the air flow path.

SUMMARY

A first aspect of the present disclosure is directed to a turbofan including a circular end plate, a ring-shaped shroud facing the end plate, and a plurality of blade members disposed between the end plate and the shroud. An annular portion of a space between the end plate and the shroud where the blade members are disposed is a pressure-increase flow path. The turbofan causes air to flow from an inner peripheral side to an outer peripheral side of the pressure-increase flow path. A cross-sectional area of the pressure-increase flow path increases gradually from an upstream end toward a downstream end of the pressure-increase flow path.

DETAILED DESCRIPTION OF EMBODIMENT(S)

Embodiments of the present invention will be described in detail with reference to the drawings. A turbofan (30) of this embodiment is provided in an indoor unit (10) of an air conditioner.

Indoor Unit

Figure 1:
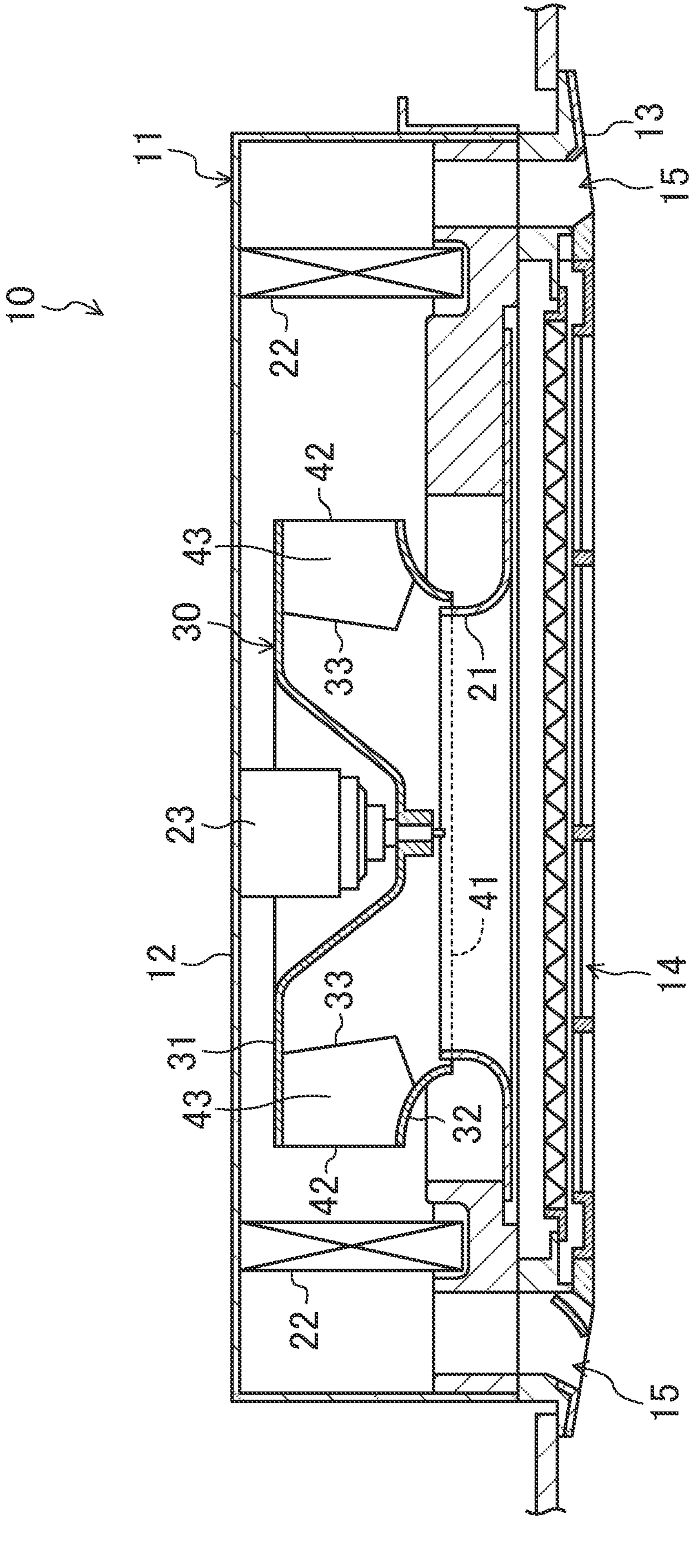
FIG. 1 is a schematic cross-sectional view of an indoor unit including a turbofan.

As illustrated in FIG. 1, the indoor unit (10) is configured as a ceiling embedded indoor unit. The indoor unit (10) is connected to an outdoor unit (not shown) through a connection pipe, thereby forming the air conditioner.

The indoor unit (10) includes a box-shaped casing (11). A decorative panel (13) forming a lower surface of the casing (11) has an inlet (14) and an outlet (15). The inlet (14) is formed in a central portion of the decorative panel (13). The outlet (15) surrounds the inlet (14).

The casing (11) houses components, such as a bell mouth (21), the turbofan (30), and an indoor heat exchanger (22). The bell mouth (21) is disposed above the inlet (14). The turbofan (30) is disposed above the bell mouth (21). The turbofan (30) is fixed to a top panel (12) of the casing (11) with a fan motor (23) interposed therebetween. The indoor heat exchanger (22) is arranged to surround the turbofan (30).

Air is drawn into the casing (11) through the inlet (14) when the turbofan (30) is driven by the fan motor (23). The air drawn into the casing (11) is drawn through the bell mouth (21) into the turbofan (30). The turbofan (30) draws the air from below and expels the air radially outward. The air expelled through the turbofan (30) is cooled or heated while passing through the indoor heat exchanger (22). The air that has passed through the indoor heat exchanger (22) is expelled through the outlet (15) to the outside of the casing (11).

Turbofan

Figure 2:
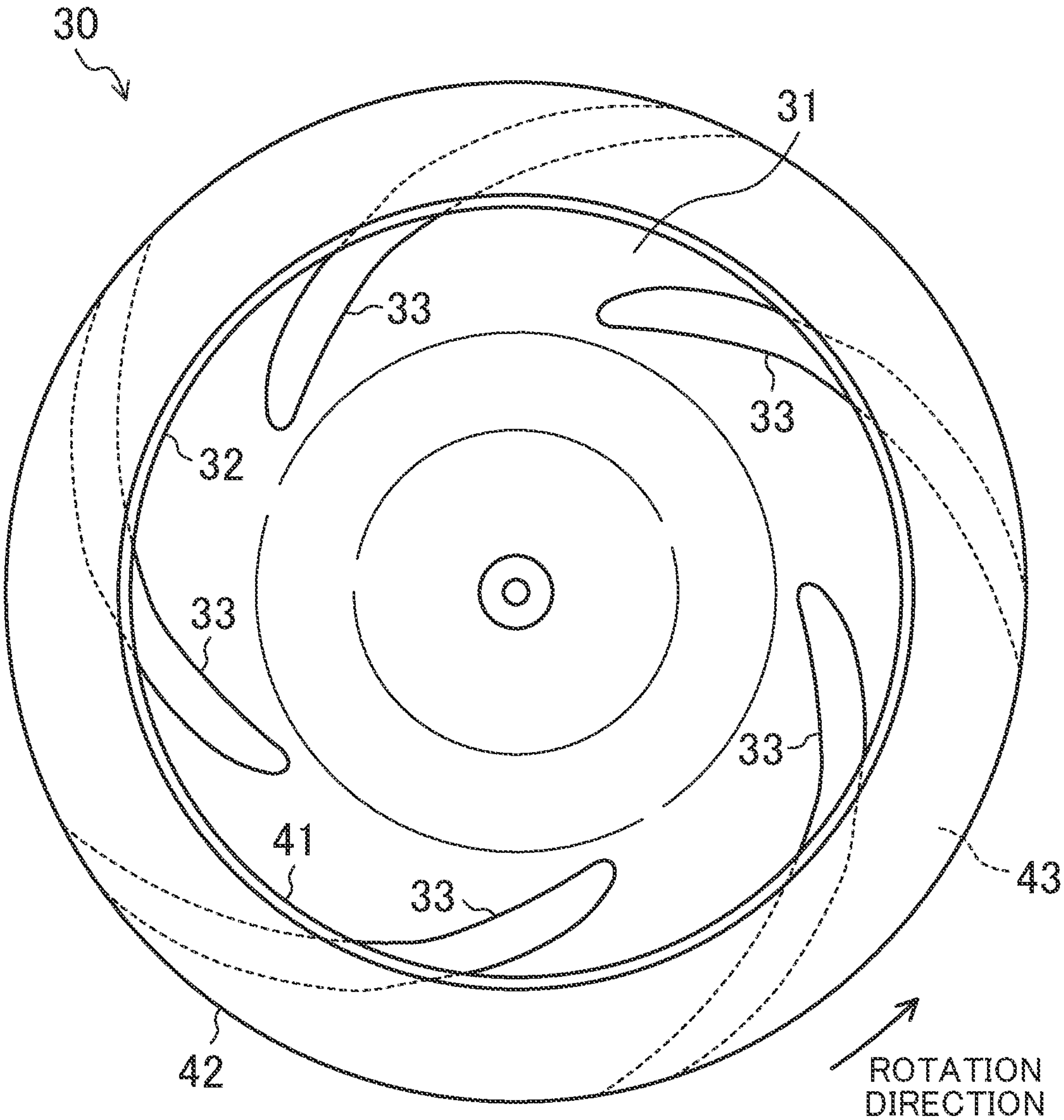
FIG. 2 is a bottom view of the turbofan provided in the indoor unit illustrated in FIG. 1.

As illustrated in FIGS. 1 and 2, the turbofan (30) includes one end plate (31), one shroud (32), and five blade members (33). The number of the blade members (33) is merely an example.

The end plate (31) is a disk-shaped member having a recessed central portion. A drive shaft of the fan motor (23) is coupled to the end plate (31). The end plate (31) is disposed coaxially with the drive shaft of the fan motor (23). The center axis (CX) of the end plate (31) is the rotation center axis of the turbofan (30). The center axis (CX) of the end plate (31) substantially coincides with the center axis of the drive shaft of the fan motor.

The shroud (32) is a ring-shaped member. The shroud (32) is spaced apart from, and faces, the end plate (31). The shroud (32) is disposed substantially coaxially with the end plate (31). The outer diameter of the shroud (32) is generally equal to the outer diameter of the end plate (31). The shroud (32) has an inner peripheral edge that projects away from the end plate (31). In the turbofan (30), the inner peripheral edge of the shroud (32) defines a fan inlet (41), and the outer peripheral edge of the end plate (31) and the outer peripheral edge of the shroud (32) define a fan outlet (42).

The blade members (33) are provided between the end plate (31) and the shroud (32). The blade members (33) are disposed in a region of the end plate (31) closer to the outer peripheral edge thereof. Upper edge portions of the blade members (33) as observed in FIG. 1 are fixed to the end plate (31). Lower edge portions of the blade members (33) as observed in FIG. 1 are fixed to the shroud (32). As illustrated in FIG. 2, the five blade members (33) are arranged at predetermined angular intervals in the circumferential direction of the end plate (31) and the shroud (32). The angular intervals of these five blade members (33) are not regular intervals. The leading edge (52) of each blade member (33) located forward in the rotation direction of the turbofan (30) is closer to the center of the end plate (31) than the trailing edge (53) of the blade member (33) located backward in the rotation direction of the turbofan (30) is.

Pressure-Increase Flow Path of Turbofan

Figure 3:
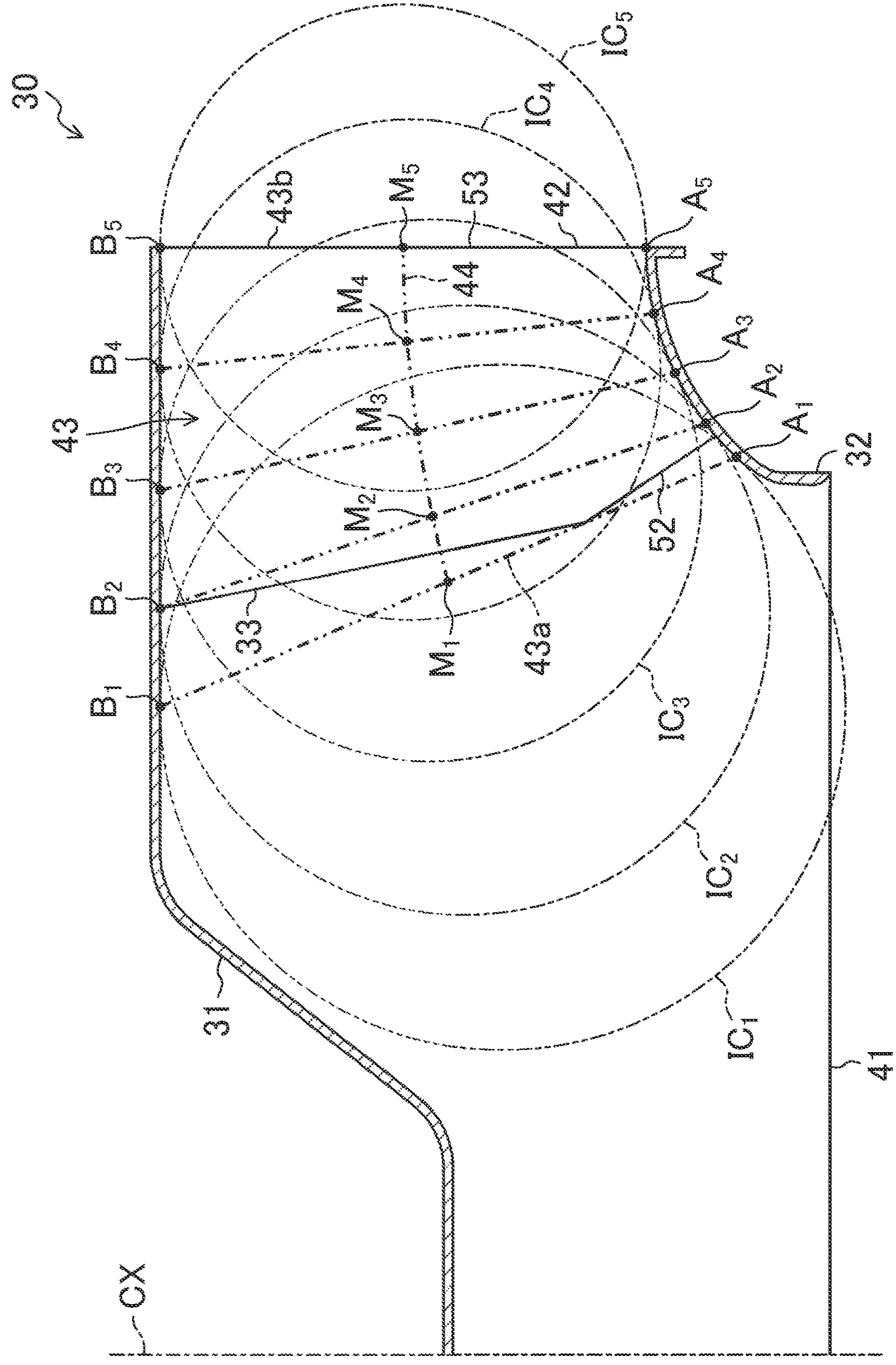
FIG. 3 is a cross-sectional view illustrating a cross section of the turbofan including the rotation center axis of the turbofan.

As illustrated in FIG. 3, of a space between the end plate (31) and the shroud (32) of the turbofan (30) of this embodiment, a portion where the blade members (33) are provided forms a pressure-increase flow path (43). The pressure-increase flow path (43) is an annular flow path continuous with the fan outlet (42) of the turbofan (30). Air passing through the turbofan (30) flows through the pressure-increase flow path (43) from the inside toward the outside in the radial direction of the pressure-increase flow path (43). According to the turbofan (30) of this embodiment, the cross-sectional area of the pressure-increase flow path (43) increases gradually from the upstream end (43*a*) toward the downstream end (43*b*) of the pressure-increase flow path (43).

Cross-Sectional Area of Pressure-Increase Flow Path

The cross-sectional area of the pressure-increase flow path (43) will be described. The cross-sectional area of the pressure-increase flow path (43) is the area of a cross section that intersects with the radial direction of the pressure-increase flow path (43).

As viewed in the cross section illustrated in FIG. 3, $A_n$ represents an optional point on the inner surface (upper surface in FIG. 3) of the shroud (32), and $B_n$ represents a point located on the inner surface (lower surface in FIG. 3) of the end plate (31) and corresponding to the point $A_n$. Here, a circle touching both of the inner surface of the shroud (32) and the inner surface of the end plate (31) and making contact at the point $A_n$ is defined as an inscribed circle $IC_n$. The point $B_n$ is the point of contact between the inner surface of the end plate (31) and the inscribed circle $IC_n$ as viewed in the cross section illustrated in FIG. 3.

Figure 4:
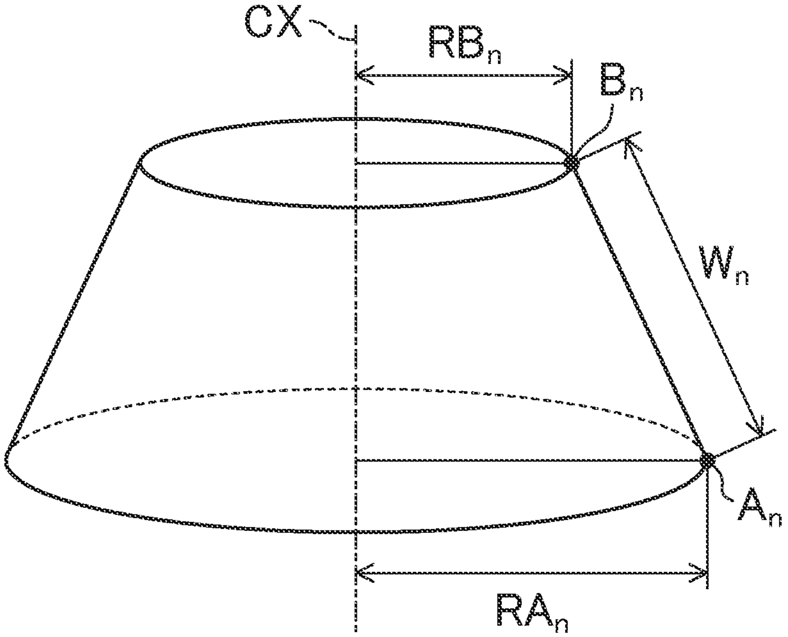
FIG. 4 is a diagram for illustrating the shape of a cross section of a pressure-increase flow path.

As illustrated in FIG. 4, $RA_n$ represents the distance from the center axis (CX) of the end plate (31) to the point $A_n$, and $RB_n$ represents the distance from the center axis (CX) of the end plate (31) to the point $B_n$. The length of the line segment $A_nB_n$ is defined as the flow path width $W_n$ of the pressure-increase flow path (43) corresponding to the point $A_n$.

The subscript n is an integer from 1 to N. The subscript is n=1 at the upstream end (43*a*) of the pressure-increase flow path (43), and n=N at the downstream end (43*b*) of the pressure-increase flow path (43). FIG. 3 shows the state where N=5.

The cross-sectional area $S_n$ of a cross section of the pressure-increase flow path (43) corresponding to the point $A_n$ is the area of a figure obtained by rotating the line segment $A_nB_n$ by 360° around the center axis (CX) of the end plate (31). As illustrated in FIG. 4, the cross-sectional area $S_n$ of the cross section of the pressure-increase flow path (43) corresponding to the point $A_n$ is the lateral area of a conical frustum having a top radius of $RB_n$ and a base radius of $RA_n$, and is expressed by the following formula.

$$S_n=\pi(RA_n+RB_n)W_n$$

The cross section of the pressure-increase flow path (43) corresponding to the point $A_1$ (specifically, a figure obtained by rotating the line segment $A_1B_1$ by 360° around the center axis (CX) of the end plate (31)) corresponds to the upstream end (43*a*) of the pressure-increase flow path (43). The line segment $A_1B_1$ is a line segment intersecting with the leading edge (52) of the blade member (33) and closest to the center axis (CX) of the end plate (31). The cross section of the pressure-increase flow path (43) corresponding to the point $A_N$ (specifically, a figure obtained by rotating the line segment $A_NB_N$ by 360° around the center axis (CX) of the end plate (31)) corresponds to the downstream end (43*b*) of the pressure-increase flow path (43). The line segment $A_NB_N$ is a line segment intersecting with the trailing edge (53) of the blade member (33) and farthest from the center axis (CX) of the end plate (31). The downstream end (43*b*) of the pressure-increase flow path (43) substantially coincides with the fan outlet (42) of the turbofan (30).

Variation in Cross-Sectional Area of Pressure-Increase Flow Path

As described above, the cross-sectional area of the pressure-increase flow path (43) increases gradually from the upstream end (43*a*) toward the downstream end (43*b*) of the pressure-increase flow path (43). Thus, the cross-sectional areas $S_1$ to $S_5$ respectively corresponding to the points $A_1$ to $A_5$ illustrated in FIG. 3 satisfy the relationship of "$S_1<S_2<S_3<S_4<S_5$."

The area magnification ratio $S_N/S_1$ of the pressure-increase flow path (43) of this embodiment that is a value obtained by dividing "the cross-sectional area $S_N$ of the downstream end (43*b*) of the pressure-increase flow path (43)" by "the cross-sectional area $S_1$ of the upstream end (43*a*) of the pressure-increase flow path (43)" is greater than or equal to 1.2 and less than or equal to 1.55.

Figure 5:
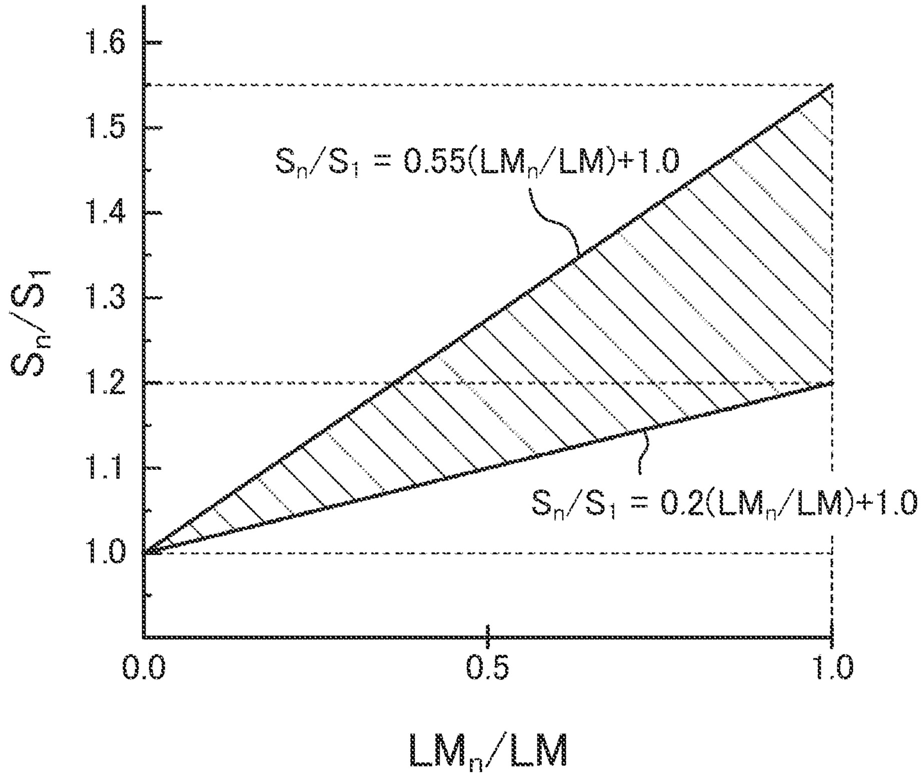
FIG. 5 is a graph showing variations in the cross-sectional area of the pressure-increase flow path from the upstream end to the downstream end of the pressure-increase flow path.

The area ratio $S_n/S_1$ of the pressure-increase flow path (43) of this embodiment that is a value obtained by dividing "the cross-sectional area $S_n$ of the pressure-increase flow path (43) corresponding to the optional point $A_n$" by "the cross-sectional area $S_1$ of the upstream end (43*a*) of the pressure-increase flow path (43)" is a value within the hatched region in FIG. 5.

Here, $M_n$ represents the midpoint of the flow path width $W_n$ corresponding to the point $A_n$ as viewed in the cross section illustrated in FIG. 3. LM represents the length of a width central line (44) that is a line connecting the midpoints $M_1$ to $M_N$ from the upstream end (43*a*) to the downstream end (43*b*) of the pressure-increase flow path (43), and $LM_n$ represents the length of a portion of this width central line (44) from the midpoints $M_1$ to $M_n$. As described above, the area ratio $S_n/S_1$ of the pressure-increase flow path (43) of this embodiment is a value within the hatched region in FIG. 5. In other words, the pressure-increase flow path (43) of this embodiment satisfies the following relationship.

$$0.2(LM_n/LM)+1.0\leq S_n/S_1\leq 0.55(LM_n/LM)+1.0$$

Inlet Angle and Outlet Angle of Blade Member

The inlet angle $\theta_i$ and the outlet angle $\theta_o$ of each blade member (33) will be described with reference to FIG. 6.

The plurality of blade members (33) (five in this embodiment) of the turbofan (30) of this embodiment have the same shape. These blade members (33) are provided between the end plate (31) and the shroud (32) each with the same inlet angle $\theta_i$ and the same outlet angle $\theta_o$ as those illustrated in FIG. 6.

Figure 6:
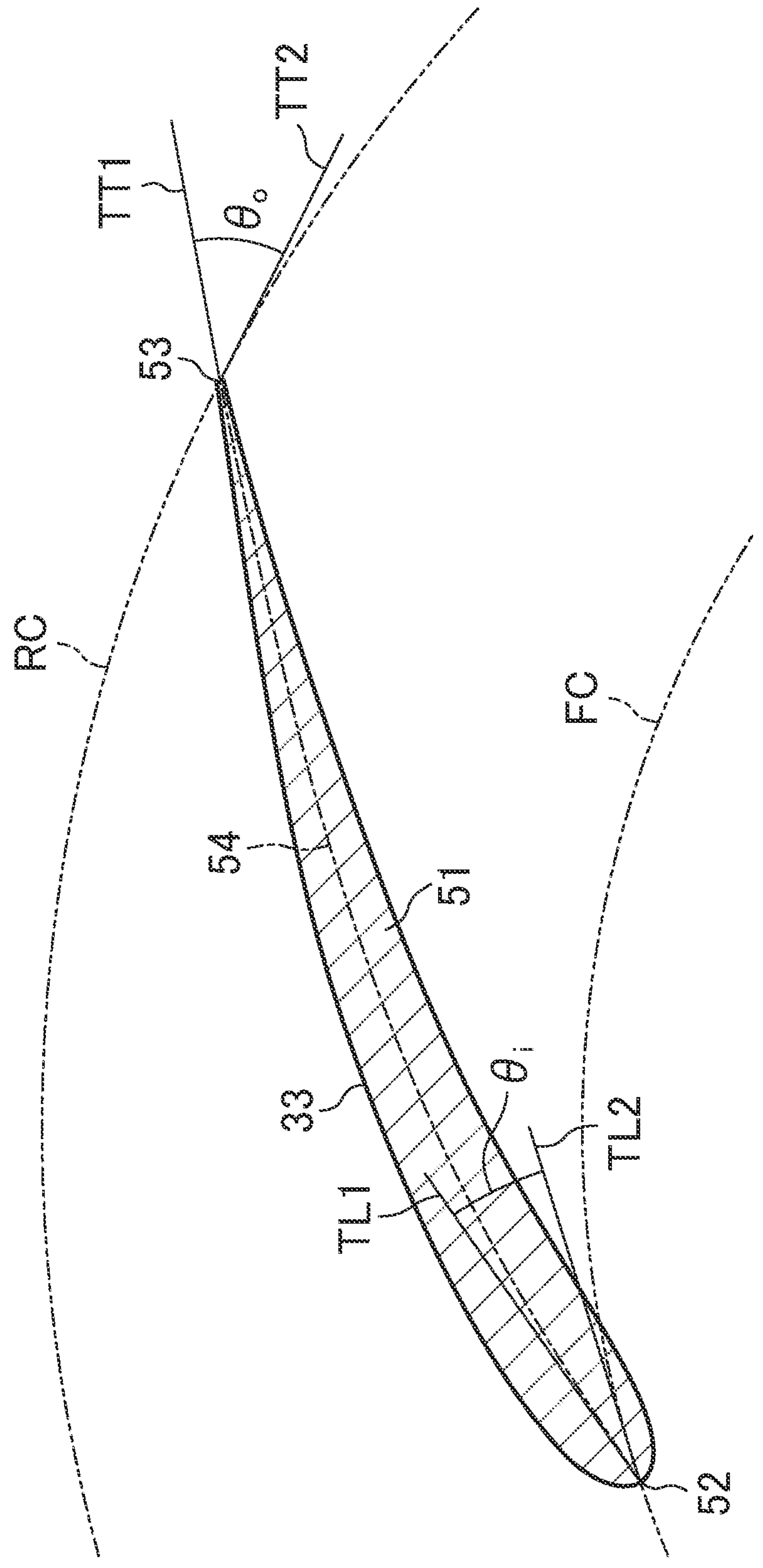
FIG. 6 is a cross-sectional view illustrating a target cross section of a blade member.

A target cross section (51) of the blade member (33) illustrated in FIG. 6 is a cross section intersecting with the leading edge (52) and the trailing edge (53) of the blade member (33), and shows an airfoil of the blade member (33). The camber line (54) of the target cross section (51) is a line connecting midpoints, in the thickness direction, of the target cross section (51) from the leading edge (52) to the trailing edge (53) of the target cross section (51). A circle passing through the leading edge (52) of the target cross section (51) and centered at the center axis (CX) of the end plate (31) is referred to as a front circle (FC). A circle passing through the trailing edge (53) of the target cross section (51) and centered at the center axis (CX) of the end plate (31) is referred to as a rear circle (RC).

The inlet angle $\theta_i$ of the target cross section (51) is an angle formed by a tangent TL1 to the camber line (54) at the leading edge (52) of the target cross section (51) and a tangent TL2 to the front circle (FC) at the leading edge (52) of the target cross section (51). The outlet angle $\theta_o$ of the target cross section (51) is an angle formed by a tangent TT1 to the camber line (54) at the trailing edge (53) of the target cross section (51) and a tangent TT2 to the rear circle (RC) at the trailing edge (53) of the target cross section (51).

The shape of the target cross section (51) of the blade member (33) (i.e., the airfoil of the blade member (33)) varies in the span direction of the blade member (33) (the direction along the leading edge (52) or the trailing edge (53)). Thus, the inlet angle θ, and the outlet angle $\theta_o$ of the blade member (33) differ according to where to take the target cross section (51). A value obtained by dividing the outlet angle $\theta_o$ by the inlet angle $\theta_i$ is referred to as the angle ratio $\theta_o/\theta_i$. In each of the blade members (33) of the turbofan (30) of this embodiment, the average of the angle ratios $\theta_o/\theta_i$ in the span direction of the blade member (33) is greater than or equal to 1.0 and less than 2.5. In one preferred embodiment, the average of the angle ratios $\theta_o/\theta_i$ is greater than or equal to 1.0 and less than or equal to 2.1.

Target Cross Section of Blade Member

The target cross section (51) of each of the blade members (33) will be described with reference to FIG. 7. The blade members (33) may be solid or hollow.

Figure 7:
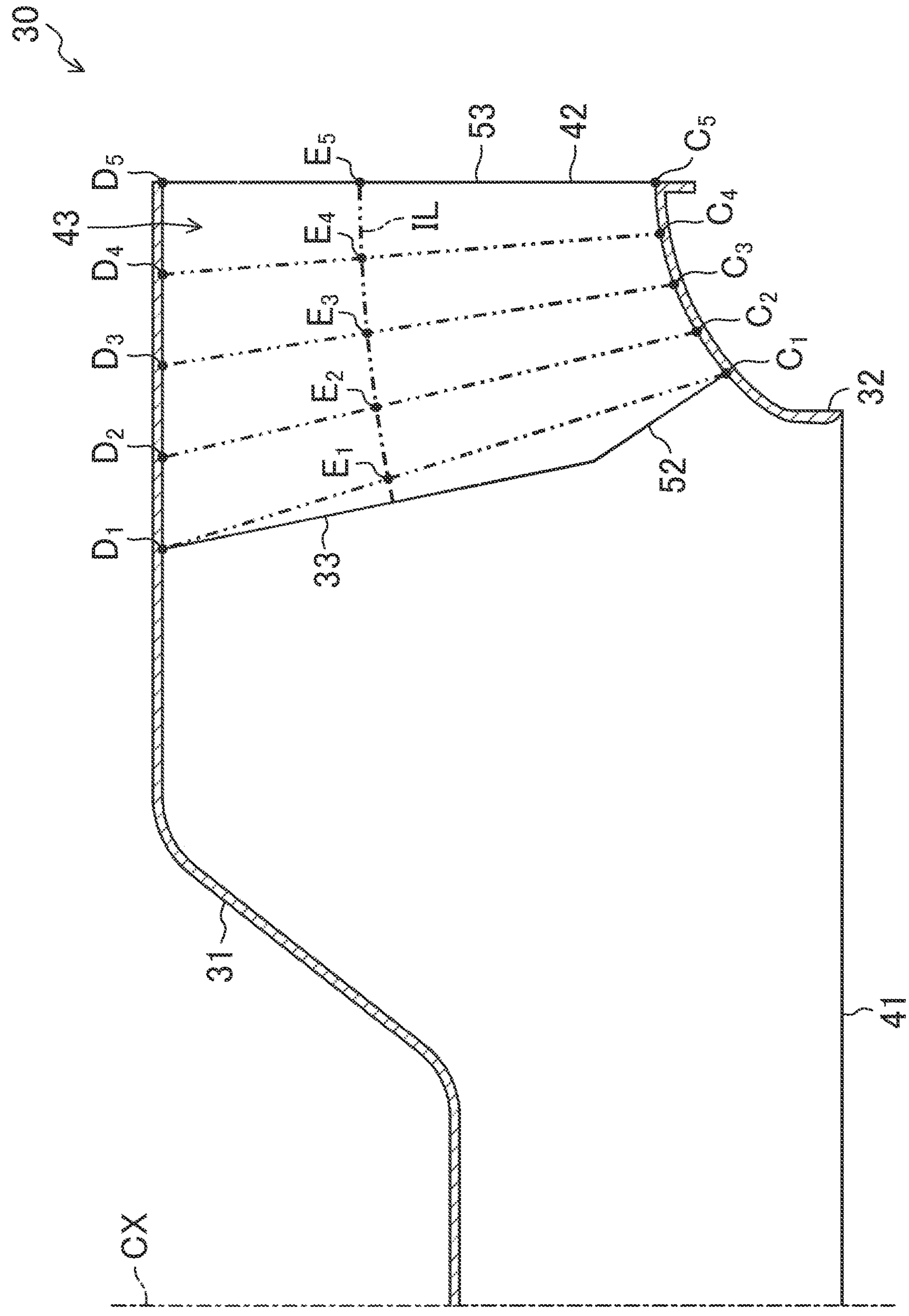
FIG. 7 is a cross-sectional view illustrating a cross section of the turbofan including the rotation center axis of the turbofan.

FIG. 7 shows a meridional plane shape of the blade member (33). The edge of the meridional plane shape along the shroud (32) (the edge of the lower end in FIG. 7) is divided into a plurality of equal parts to allocate a plurality of points $C_n$. The edge of the meridional plane shape along the end plate (31) (the edge of the upper end in FIG. 7) is divided into a plurality of equal parts to allocate a plurality of points $D_n$. The number of the points $D_n$ is equal to the number of the points $C_n$. The meridional plane shape of the blade member (33) is the shape of a figure of a revolved projection of the blade member (33) onto a plane including the center axis (CX) of the end plate (31).

The subscript n is an integer from 1 to N. The subscript n is n=1 on the leading edge (52) and n=N on the trailing edge (53) on each of the edge along the shroud (32) and the edge along the end plate (31) of the meridional plane shape of the blade member (33) illustrated in FIG. 7. FIG. 7 shows a case where N=5 (specifically, a case where the upper and lower edges of the meridional plane shape of the blade member (33) are each divided into four equal parts).

The point $E_n$ is set on each of line segments $C_nD_n$. The points $E_n$ on the line segment $C_nD_n$ are those provided so that the ratio (HE/HD) of the length HE of the line segment $C_nE_n$ to the length HD of each line segment $C_nD_n$ is the same. A curve smoothly connecting the points $E_1$ to $E_N$ is referred to as the curve IL. A cross section of the blade member (33) taken along a curved plane obtained by rotating this curve IL around the center axis (CX) of the end plate (31) is a target cross section (51) corresponding to the point $E_n$.

Air Flow Through Turbofan

The turbofan (30) of this embodiment, when driven to rotate by the fan motor (23), draws air through the fan inlet (41) and expels the drawn air through the fan outlet (42) after increasing the pressure of the drawn air. Air flows into the fan inlet (41) along the direction of the rotation center axis of the turbofan (30). Inside the turbofan (30), the direction of the air flow changes radially outward from the direction of the rotation center axis of the turbofan (30).

Air flowing through the inside of the turbofan (30) flows into the pressure-increase flow path (43), and flows from the upstream end (43*a*) toward the downstream end (43*b*) of the pressure-increase flow path (43). The cross-sectional area of the pressure-increase flow path (43) of this embodiment increases gradually from the upstream end (43*a*) toward the downstream end (43*b*) of the pressure-increase flow path (43). Thus, in the course of passage of air through the pressure-increase flow path (43), the air velocity decreases gradually, whereas the air pressure increases gradually. The total head of the air flowing through the pressure-increase flow path (43) is substantially constant. Thus, if the air velocity decreases, and hence the velocity head decreases, the pressure head increases by the decrement of the velocity head. As a result, the air pressure increases. As can be seen, the pressure-increase flow path (43) of this embodiment provides the diffuser effect.

The blade members (33) are disposed in the pressure-increase flow path (43) of the turbofan (30). The blade members (33) increase the pressure of the air due to a change in the air flow velocity in the rotation direction from the leading edge (52) to the trailing edge (53) of each blade member (33) and the difference in circumferential velocity between the leading edge (52) and trailing edge (53) of the blade member (33). In this manner, the blade member (33) provides the pressure-increase effect increasing the air pressure. The air flow velocity in the rotation direction is a tangential component of the absolute velocity vector of an air flow between an adjacent pair of the blade members (33) with respect to a circle centered at the center axis (CX).

The turbofan (30) of this embodiment utilizes the pressure-increase effect of the blade members (33) and the diffuser effect of the pressure-increase flow path (43) to increase the air pressure. It is therefore possible to set the average of the angle ratios $\theta_o/\theta_i$ of each blade member (33) to be relatively smaller, compared to known art, while keeping the amount of pressure increase of air in the turbofan (30) at substantially the same level as in known art. As a result, the "slip flow" of air can be reduced to a small amount; it is thus possible to reduce the possibility that the air flow is apart from the surface of the blade member (33) and is separated in the end. Thus, according to the turbofan (30) of this embodiment, the power consumed by the fan motor (23) in driving the turbofan (30) can be reduced while keeping the amount of pressure increase of air in the turbofan (30) at substantially the same level as in known art.

Feature (1) of Embodiment

The turbofan (30) of this embodiment includes the circular end plate (31), the ring-shaped shroud (32) facing the end plate (31), and the plurality of blade members (33) arranged between the end plate (31) and the shroud (32). Of the space between the end plate (31) and the shroud (32), the annular portion where the blade members (33) are provided forms the pressure-increase flow path (43). The turbofan (30) causes air to flow from the inner peripheral side to the outer peripheral side of the pressure-increase flow path (43). In the turbofan (30), the cross-sectional area of the pressure-increase flow path (43) increases gradually from the upstream end (43*a*) toward the downstream end (43*b*) of the pressure-increase flow path (43).

According to the turbofan (30) of this embodiment, the cross-sectional area of the pressure-increase flow path (43) increases gradually from the upstream end (43*a*) toward the downstream end (43*b*) of the pressure-increase flow path (43). Thus, in the course of passage of air through the pressure-increase flow path (43), the air flow velocity decreases gradually, which causes the air pressure to increase gradually. As can be seen, the pressure-increase flow path (43) of the turbofan (30) of this embodiment provides the diffuser effect. Thus, the turbofan (30) of this embodiment utilizes both of the pressure-increase effect of the blade members (33) and the diffuser effect of the pressure-increase flow path (43) to increase the pressure of the air flowing through the pressure-increase flow path (43). As a result, the pressure-increase effect of the turbofan (30) improves.

Feature (2) of Embodiment

In the turbofan (30) of this embodiment, the area magnification ratio $S_N/S_1$ that is a value obtained by dividing the cross-sectional area $S_N$ of the downstream end (43*b*) of the pressure-increase flow path (43) by the cross-sectional area $S_1$ of the upstream end (43*a*) of the pressure-increase flow path (43) is greater than or equal to 1.2.

If the area magnification ratio of the pressure-increase flow path (43) is too low, the diffuser effect of the pressure-increase flow path (43) is too low to increase the air pressure to an adequate level. Thus, according to the turbofan (30) of this embodiment, the area magnification ratio $S_N/S_1$ of the pressure-increase flow path (43) is set to be greater than or equal to 1.2 to ensure the diffuser effect of the pressure-increase flow path (43).

Feature (3) of Embodiment

According to the turbofan (30) of this embodiment, the area magnification ratio $S_N/S_1$ of the pressure-increase flow path (43) is less than or equal to 1.55.

If the area magnification ratio of the pressure-increase flow path (43) is too high, the air flow velocity of air flowing through the pressure-increase flow path (43) decreases too much, resulting in higher possibility for the air flow to be separated from the surfaces of the end plate (31), the shroud (32), and the blade members (33). Such separation of the air flow results in an increase in power required to rotate the turbofan (30). Thus, according to the turbofan (30) of this embodiment, the area magnification ratio $S_N/S_1$ of the pressure-increase flow path (43) is set to be less than or equal to 1.55 to reduce the power consumed by the fan motor (23) in driving the turbofan (30).

Feature (4) of Embodiment

The cross section showing the airfoil of the blade member (33) is referred to as the target cross section (51). A circle passing through the leading edge (52) of the target cross section (51) and centered at the center axis (CX) of the end plate (31) is referred to as the front circle (FC). A circle passing through the trailing edge (53) of the target cross section (51) and centered at the center axis (CX) of the end plate (31) is referred to as the rear circle (RC). The angle formed at the leading edge (52) of the target cross section (51) by the tangent to the camber line (54) of the target cross section (51) and the tangent to the front circle (FC) is referred to as the inlet angle $\theta_i$. The angle formed at the trailing edge (53) of the target cross section (51) by the tangent to the camber line (54) of the target cross section (51) and the tangent to the rear circle (RC) is referred to as the outlet angle $\theta_o$. A value obtained by dividing the outlet angle $\theta_o$ by the inlet angle $\theta_i$ is referred to as the angle ratio $\theta_o/\theta_i$. In the turbofan (30) of this embodiment, the average of the angle ratios $\theta_o/\theta_i$ of the entirety of each blade member (33) is less than 2.5.

The higher the angle ratio $\theta_o/\theta_i$ of the blade member (33) is, the more easily a "slip flow" of air occurs. The "slip flow" is the phenomenon where the direction of the air flow flowing out of the blade member (33) slips in the direction opposite to the direction of revolution of the blade member (33) with respect to the direction along the surface of the blade member (33). The larger amount of this "slip flow" makes a larger angle between the direction of the air flow flowing out of the trailing edge (53) of the blade member (33) and the direction of the trailing edge (53) of the blade member (33). As a result, the mixing loss increases, and the amount of pressure increase of air decreases. Increasing the rotational speed of the turbofan (30) to compensate for the reduction in the amount of pressure increase of the air leads to an increase in the power required to rotate the turbofan (30).

If the angle ratio $\theta_o/\theta_i$ of the blade member (33) is too high, the direction of the air flow along the blade member (33) changes greatly, resulting in higher possibility for the air flow to be apart from the surface of the blade member (33) and separated in the end. Separation of the air flow from the surface of the blade member (33) results in an increase in power required to rotate the turbofan (30).

As can be seen, if the angle ratio $\theta_o/\theta_i$ of the blade member (33) is too high, the power required to rotate the turbofan (30) increases. Thus, according to the turbofan (30) of this embodiment, the average of the angle ratios of the entirety of each blade member (33) is set to be less than 2.5 to reduce the power consumed by the fan motor (23) in driving the turbofan (30).

Feature (5) of Embodiment

In the turbofan (30) of this embodiment, the average of the angle ratios $\theta_o/\theta_i$ of the entirety of each blade member (33) is less than or equal to 2.1.

The amount of "slip flow" can thus be reduced to a small amount. In addition, the possibility for the air flow to be apart from the surface of the blade member (33) and separated in the end is reduced even if the air flow velocity of air flowing through the pressure-increase flow path (43) decreases. Thus, according to the turbofan (30) of this embodiment, the power consumed by the fan motor (23) in rotating the turbofan (30) can be reduced to a low level.

Feature (6) of Embodiment

In the turbofan (30) of this embodiment, the average of the angle ratios $\theta_o/\theta_i$ of the entirety of each blade member (33) is greater than or equal to 1.0.

If the average of the angle ratios of the entirety of each blade member (33) is too low, the pressure-increase effect of the blade member (33) may be so low that the pressure-increase effect of the turbofan (30) may be insufficient. Thus, according to the turbofan (30) of this embodiment, the average of the angle ratios of the entirety of the blade member (33) is set to be greater than 1.0 to ensure the pressure-increase effect of the turbofan (30).

Variations of Embodiment

The turbofan (30) of this embodiment may be provided in a device other than the indoor unit (10) of the air conditioner. The application of the turbofan (30) described herein is merely an example.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

As can be seen from the foregoing description, the present disclosure is useful for a turbofan.

The invention claimed is:

1. A turbofan, comprising:

a circular end plate;

a ring-shaped shroud facing the end plate; and a plurality of blade members disposed between the end plate and the shroud, each of the blade members being fixed to both the end plate and the shroud, an annular portion of a space between the end plate and the shroud where the blade members are disposed being a pressure-increase flow path, the turbofan causing air to flow from an inner peripheral side to an outer peripheral side of the pressure-increase flow path through rotation of the end plate, the shroud, and the blade members, which rotate together as a unit, and a cross-sectional area of the pressure-increase flow path increasing gradually from an upstream end toward a downstream end thereof.

2. The turbofan of claim 1, wherein an area magnification ratio $S_N/S_1$ is at least 1.2, where $S_N$ is a cross-sectional area of the downstream end of the pressure-increase flow path, and $S_1$ is a cross-sectional area of the upstream end of the pressure-increase flow path.

3. The turbofan of claim 2, wherein the area magnification ratio $S_N/S_1$ of the pressure-increase flow path is no more than 1.55.

4. The turbofan of claim 1, wherein a cross section showing an airfoil of each of the blade members is a target cross section, a circle passing through a leading edge of the target cross section and centered at a center axis of the end plate is a front circle, a circle passing through a trailing edge of the target cross section and centered at the center axis of the end plate is a rear circle, an angle formed at the leading edge of the target cross section by a tangent to a camber line of the target cross section and a tangent to the front circle is an inlet angle $\theta_i$, an angle formed at the trailing edge of the target cross section by a tangent to the camber line of the target cross section and a tangent to the rear circle is an outlet angle $\theta_o$, a value obtained by dividing, the outlet angle $\theta_o$ by the inlet angle $\theta_i$ is an angle ratio $\theta_o/\theta_i$, and an average of the angle ratios $\theta_o/\theta_i$ of an entirety of the blade member is less than 2.5.

5. The turbofan of claim 4, wherein the average of the angle ratios $\theta_o/\theta_i$ of the entirety of the blade member is no more than 2.1.

6. The turbofan of claim 4, wherein the average of the angle ratios $\theta_o/\theta_i$ of the entirety of the blade member is at least 1.0.

7. The turbofan of claim 5, wherein the average of the angle ratios $\theta_o/\theta_i$ of the entirety of the blade member is at least 1.0.

* * * * *